United States Patent [19]
Suda et al.

[11] Patent Number: 6,029,123
[45] Date of Patent: *Feb. 22, 2000

[54] NATURAL LANGUAGE PROCESSING SYSTEM AND METHOD FOR EXPECTING NATURAL LANGUAGE INFORMATION TO BE PROCESSED AND FOR EXECUTING THE PROCESSING BASED ON THE EXPECTED INFORMATION

[75] Inventors: Aruna Rohra Suda; Suresh Jeyachandran, both of Yokohama, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/571,195

[22] Filed: Dec. 12, 1995

[30] Foreign Application Priority Data

Dec. 13, 1994 [JP] Japan .................................... 6-308896

[51] Int. Cl.$^7$ ..................................................... G06F 17/38
[52] U.S. Cl. .................................................................. 704/9
[58] Field of Search ................................ 704/9, 10, 2, 1; 382/175, 229; 364/975; 395/12; 707/500

[56] References Cited

U.S. PATENT DOCUMENTS

| 5,050,218 | 9/1991 | Ikeda et al. | 382/1 |
| 5,159,667 | 10/1992 | Borrey et al. | 395/148 |
| 5,377,281 | 12/1994 | Ballard et al. | 382/40 |
| 5,404,506 | 4/1995 | Fujisawa et al. | 395/600 |
| 5,555,169 | 9/1996 | Namba et al. | 704/9 |
| 5,590,039 | 12/1996 | Ikeda et al. | 395/759 |
| 5,659,668 | 8/1997 | Misono et al. | 395/75 |

FOREIGN PATENT DOCUMENTS 0 280 866 A2  9/1988  European Pat. Off. ........ G06F 15/40

OTHER PUBLICATIONS

L.G. Occena, et al., "A Logic–Based Framework for Address Interpretation and Rectification", *Computers in Industry*, vol. 20, No. 1, pp. 63–73, Jul. 1, 1992, XP000288646.

K. Matsuzawa, et al., "Human Interface Using Domain Knowledge Retrieval", *Systems and Computers in Japan*, vol. 19, No. 10, pp. 88–95, Oct. 1988, ISSN 0882–1666, XP000670378.

S. R. Young, "Use of Dialogue, Pragmatics and Semantics to Enhance Speech Recognition", delivered as keynote address for *Eurospeech '89*, Paris, France, held Sep. 26–28, 1989 and published in vol. 9, Nos. 5–6 of *Speech Communication*, Netherlands, pp. 551–564, Dec. 1990, ISSN 0167–6393, XP000202907.

S. R. Young, et al. "High Level Knowledge Sources in Usable Speech Recognition Systems", *Communications of the ACM*, vol. 32, No. 2, pp. 183–194, Feb. 1989, ISSN 0001–0782, XP000253814.

*Primary Examiner*—Forester W. Isen
*Assistant Examiner*—Patrick N. Edouard
*Attorney, Agent, or Firm*—Fitzpatrick, Cella, Harper & Scinto

[57] ABSTRACT

A natural language processing system and method in which, in order to achieve a high accuracy of recognition of natural language information, a series of natural language information groups is progressively and sequentially recognized, with reference to a knowledge base which contains knowledge concerning the types of natural language information to be processed and knowledge concerning restriction in regard to the sequence of units of the series of natural language groups. In the course of the sequential recognition, the kind of the object to be recognized subsequently is expected based on the kinds of objects in the series of information groups which have been recognized, and a recognition result of the type which coincides with the expected type is delivered as a candidate output.

32 Claims, 17 Drawing Sheets

FIG. 6

ACTION
S1  <PERSON> who is the Agent
S2  < > which is the Object
S3  < > which is the Iobject
S4  <ACTION> which is the Iobj Reason
S5  <PLACE> which is the From
S6  <ACTION> which is the Instrument
S7  <PLACE> which is the Support
S8  <TIME> which is the Time

FIG. 8

TIME :

(1-64/1  20  )         <Era Name>

(1-
   ...

<Year Mark>
                        <Month Mark>
   (1-12)

<Day Mark>
   (1-31)

<DAY PART Mark>

PLACE :

<City Mark>
                        <Metropolis Mark>
                        <Ku Mark>

...

PERSON :

<Relative>

NUMBERS :

<NUMBER (=1)>
                        <NUMBER (=2)>

...

<NUMBER (=10)>
                        <NUMBER (=1)>

OTHERS :

<CASEMARKER>
                        <Pronoun 1>

FIG. 9

GENERAL RULES :

<Time - Phrase> :
{<Era Year><Month>}<Day>{<Daypart><Hours><Minutes>}

<Address - Phrase> :
{<Country>}{<Prefecture>}<City>{<Ku>}{<Cho><Chome><Banchi>}

<Person> :
  <Name>  or
  <Relative>  or
  <Relative><Name>

DECLARATION TYPES :

1. BIRTH :
   <Time - Phrase><Address - Phrase><Casemarker><Birth>
   <Time - Phrase><Person><Declaration>{Diff birth - place}
   <Entry in Family Register>

Diff birth - place :
   <Time - Phrase><Person><Casemarker><Forwarding>

2. DEATH :
   <Time - Phrase><Address - Phrase><Casemarker>
   <Death><Time - Phrase><Relative><Person><Notice>
   <Removal from Family Register>

<MTRANS1> :

S1 <Person1> who is Agent
S2 <EVENT1> which is Object
S3 <Person> who is the Iobject
S4 <Action> which is Iobj Reason
S5 <Place> which is From
S6 <Action> which is Instrument
S7 <Address1> which is Support
S8 <Time1> which is Time <EVENT1> :

S1 <Block Owner> who is Agent
S2 <Concept> which is Object
S3 <Person> who is the Iobject
S4 <Action> which is Iobj Reason
S5 <Place> which is From
S6 <Action> which is Instrument
S7 <Address2> which is Support
S8 <Time2> which is Time <ADDRESS1> :

S1 <Country>
S2 <Prefecture>
S3 <City>
S4 <Ku>
S5 <Cho>
S6 <Chome>
S7 <Banchi>

<ADDRESS2> :

S1 <Country>
S2 <Prefecture>
S3 <City>
S4 <Ku>
S5 <Cho>
S6 <Chome>
S7 <Banchi>

<TIME1> :

S1 <Year Era>
S2 <Month>
S3 <Day>
S4 <Day part>
S5 <Hours>
S6 <Minutes>

<TIME2> :

S1 <Year Era>
S2 <Month>
S3 <Day>
S4 <Day part>
S5 <Hours>
S6 <Minutes>

FIG. 12

<MTRANS1> :

S1 <Person1=Father>who is Agent
S2 <BIRTH1>which is Object
S3 <Person>who is the Iobject
S4 <Action>which is Iobj Reason
S5 <Place>which is From
S6 <Action>which is Instrument
S7 <Address1>which is Support
S8 <Time1>which is Time <BIRTH1> :

S1 <Block Owner>who is Agent
S2 <Concept>which is Object
S3 <Person>who is the Iobject
S4 <Action>which is Iobj Reason
S5 <Place>which is From
S6 <Action>which is Instrument
S7 <Address2>which is Support
S8 <Time2>which is Time <ADDRESS1> :

S1 <Country>
S2 <Prefecture>
S3 Yokohama City
S4 Tsurumi-Ku
S5 <Cho>
S6 <Chome>
S7 <Banchi>

<ADDRESS2> :

S1 <Country>
S2 <Prefecture>
S3 Yokohama City
S4 Tsurumi-Ku
S5 <Cho>
S6 <Chome>
S7 <Banchi>

<TIME1> :

S1 [Year=1 Era=Heisei]
S2 [Month=1]
S3 [Day=29]
S4 <Day part>
S5 <Hours>
S6 <Minutes>

<TIME2> :

S1 [Year=1 Era=Heisei]
S2 [Month=1]
S3 [Day=27]
S4 <Day part>
S5 <Hours>
S6 <Minutes>

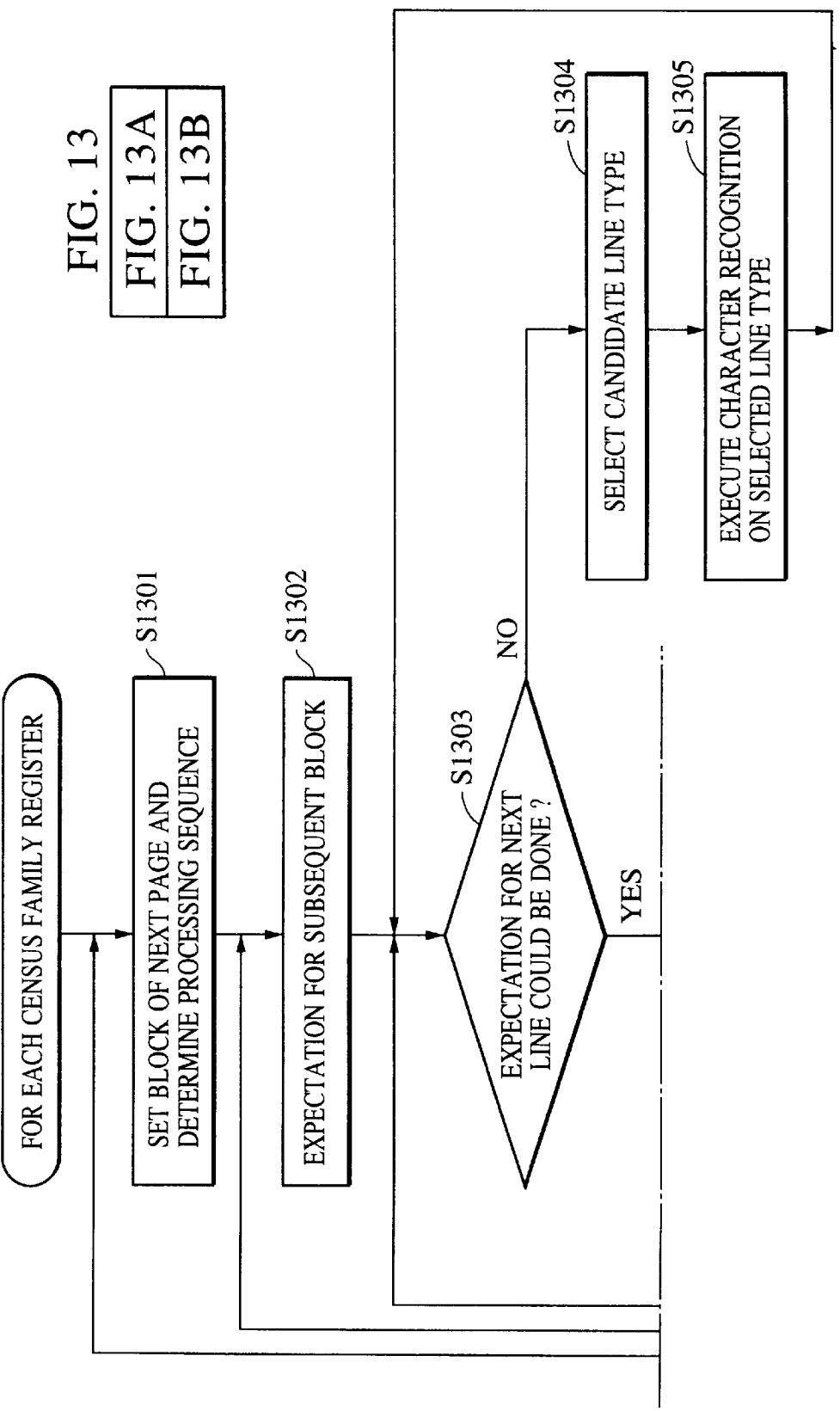

FIG. 14

OUT-DOOR DUTY FORM

Employee Code : __92392__      Date : __1994/10/02__

Name : __John  Smith__

Division : __Intelligent Systems Division__

Date (From) : __2nd  Oct__    Time : __11__    (a.m.)/ p.m.

Date (To) : _____    Time : __15 : 30__    a.m. /(p.m.)

Purpose : __Patent  Meeting with  Mr. Schultz__

Place : __Mita, Tokyo__

Mode of Transport : __Train__

Expenses : _____

Signature : _____

Passed by : _____

|  |  |  | General Rule |
|---|---|---|---|
| Months | 1-12 | (positive number >0 and <32) | Specific Rules |
| Days | 1-31 | (for months 1,2,5,7,8,10,12) | |
|  | 1-30 | (for months 4,6,9,11) | |
|  | 1-28/29 | (for month 2) | |
| ○ ○ ○ | | | |
| [Locale specific rules-Japan] | | | |
| Year | 1-64 | (for 昭和) | |
|  | 1- | (for 平成) | |
| ○ ○ ○ | | | |

NATURAL LANGUAGE PROCESSING SYSTEM AND METHOD FOR EXPECTING NATURAL LANGUAGE INFORMATION TO BE PROCESSED AND FOR EXECUTING THE PROCESSING BASED ON THE EXPECTED INFORMATION

BACKGROUND OF THE INVENTION

1. Field of the Invention

The present invention relates to a natural language processing system, as well as to a natural language processing method, for processing entered natural language information and, more particularly, to a natural language processing system and method for recognizing or correcting natural language information.

2. Description of the Related Art

Natural language recognizing systems have been known such as an optical character reader (OCR), a voice recognition machine, or an on-line or off-line hand-written character recognition machine. Such known natural language recognition system employs a pattern matching technique in which a character is identified as a candidate character which is selected from a group of candidate characters and which exhibits the best pattern matching with the character to be recognized.

Systems also have been proposed and used for verifying whether a row of recognized characters form a valid word, by making a reference to a dictionary.

It is true that the recognition efficiency can be remarkably improved through restricting the recognition results to valid words. Practically, however, it is often experienced that two or more valid candidate words are presented as a result of the recognition and verification so that the identification of the word cannot be performed.

It is also to be pointed out that the known recognition systems, when attempting to identify a word, do not take into consideration that a row of characters entered is a part of phrase or sentence which is described in a certain language and that each kind of information in a given context is followed by a specific type of information in accordance with meaning and/or grammatical construction of the sentence.

Operations of known natural language systems are based on an assumption that the entered information is correct without doubt. This causes an impediment to the construction of a natural language recognizing/processing system in which the processing system performs processing on information which is output from the recognition system and which may contain an error.

It is considered that execution of processing for expecting correct information as the input to the processing system, based on knowledge of a specific domain or context, contributes to correction of entered natural language information, even when the entry is made through means other than a recognition system, e.g., a keyboard. For instance, any typographical error incurred during entry can be corrected without difficulty by using a simple interface which is designed to restrict the scope or type of the information to be entered.

SUMMARY OF THE INVENTION

Accordingly, an object of the present invention is to provide a natural language processing method, as well as a natural language processing system, which, when processing a series of natural language information having a regular construction, expects the natural language information to be processed and executes required processing based on the expected information.

Another object of the present invention is to provide a natural language processing method, as well as a natural language processing system, which, when recognizing natural language information, expects the information to be processed and restricts the candidate information based on the result of the expectation.

Still another object of the present invention is to provide a natural language processing method, as well as a natural language processing system, which, when recognizing natural language information, expects the information to be processed and performs correction of the recognition based on the result of the expectation.

A further object of the present invention is to provide a natural language processing method, as well as a natural language processing system, which, when processing natural language information, expects the information to be input and performs correction of the input information based on the result of the expectation.

According to one aspect, the present invention which achieves these objectives relates to a natural language processing apparatus comprising: recognition means for recognizing natural language information; knowledge base means for storing knowledge concerning the types of said natural language information and knowledge concerning restriction in regard to the sequence of units of a series of natural language information groups of a plurality of types; and expectation means which, when said recognition means progressively and sequentially recognizes said series of natural language information groups of a plurality of types, makes reference to the knowledge stored in said knowledge base means so as to expect the subsequent object of recognition.

According to another aspect, the present invention which achieves these objectives relates to a natural language processing apparatus comprising: input means for inputting natural language information; knowledge base means for storing knowledge concerning the types of said natural language information and knowledge concerning restriction in regard to the sequence of statement of a series of natural language information groups of a plurality of types; and expectation means which expects information regarding a part of the series of natural language information groups of a plurality of types to be inputted through said input means, by making reference to the knowledge stored in said knowledge base means.

According to still another aspect, the present invention which achieves these objectives relates to a natural language processing method comprising: recognizing step in which natural language information is recognized; and expecting step in which, when a series of natural language information groups of a plurality of types is progressively and sequentially recognized in said recognizing step, the subsequent object to be recognized is expected, with a reference to a knowledge base which contains knowledge concerning the types of said natural language information and knowledge concerning restriction in regard to the sequence of units of said series of natural language information groups of a plurality of types.

According to yet another aspect, the present invention which achieves these objectives relates to a natural language processing method comprising: inputting step in which natural language information is inputted; and expecting step in which information regarding part of said series of natural language information groups inputted in said inputting step is expected, with reference to knowledge stored in a knowledge base which stores knowledge concerning the types of said natural language information and knowledge concerning restriction in regard to the sequence of statement of said series of natural language information groups of a plurality of types.

Other objectives and advantages besides those discussed above shall be apparent to those skilled in the art from the description of a preferred embodiment of the invention which follows. In the description, reference is made to accompanying drawings, which form a part thereof, and which illustrates an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 6 is a chart illustrative of a knowledge structure for an action;

FIG. 8 is an illustration of knowledge contained in an ordinary dictionary;

FIG. 9 is an illustration of a general rule of description;

FIG. 10 is an illustration of a rule of description in the domain of census family register;

FIG. 11 is an illustration of the structure of a prepared census family register;

FIG. 12 is an illustration of the structure of an output census family register information;

FIGS. 13A and 13B are flow chart showing a census family register recognition processing;

FIG. 14 is an illustration of an out-door duty form;

FIG. 16 is an illustration of an example of the result of recognition.

DESCRIPTION OF THE PREFERRED EMBODIMENTS

A preferred embodiment of the present invention will be described with reference to the accompanying drawings.

Figure 1:
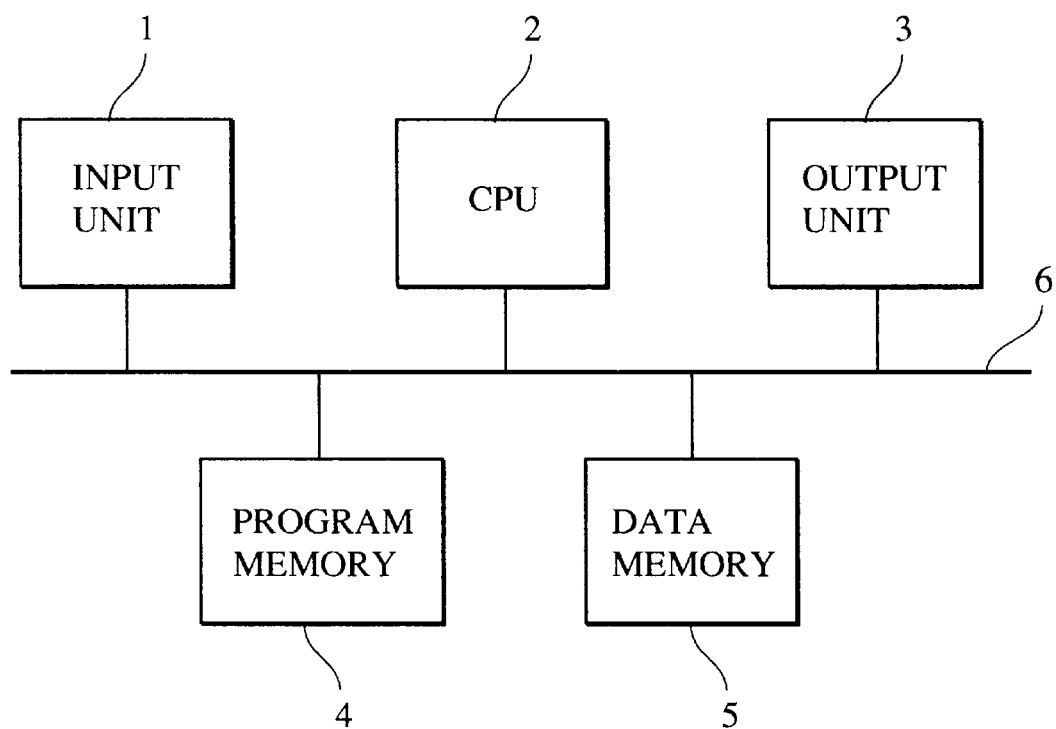
FIG. 1 is a block diagram showing the hardware structure of a natural language processing system embodying the present invention.

FIG. 1 is a block diagram showing the hardware structure of a natural language processing system as an embodiment of the present invention. The hardware comprises an input unit 1, a CPU 2, an output unit 3, a program memory 4, a data memory 5 and a BUS 6.

The input unit 1 serves as means through which information is entered or inputted in the form of a natural language. In the following description, the input information is referred to as a "text". It is to be understood, however, that the present invention can be applied to processing of natural language information of various kinds, even when the information is not a sentence which is grammatically complete, provided that the information has a structure which follows a certain rule.

The input unit 1 may comprise, for example, a voice recognition apparatus which recognizes vocal input information, a keyboard having keys for entering characters, a character recognition machine for optically reading and recognizing characters from a document, an on-line/off-line hand-written character recognition device, or a receiver which receives information from another system, e.g., a receiver which receives results of recognition performed by a character recognition system. The arrangement may be such that information generated through a different processing performed in the same system is used as the input information. It is also possible to arrange such that two or more types of input unit 1 mentioned above are prepared for selective use.

The CPU 2 performs computation and logical judgment necessary for various kinds of processing, and controls the system components which are connected to the BUS 6.

The output unit 3 serves as means for outputting data obtained through an analytical unit. The output unit 3 may comprise, for example, a voice synthesizer which synthesizes voice information from character information and outputs the synthetic voice information, a display device such as a CRT or a liquid crystal display device, a printer for printing and outputting characters on a document, or a transmission device which transmits the information to another device or system such as a data base. The arrangement may be such that information output from the output unit 3 is used as information to be input to another processing unit in the same system. The arrangement also may be such that two or more types of the output units mentioned above are prepared and used selectively.

The program memory 4 serves to store programs which are used for various controls performed by the CPU 2 including processings which will be described later with reference to flow charts. The program memory 4 may comprise a ROM or a RAM which is adapted to be externally loaded with programs.

The data memory 5 stores data generated through various processings, as well as various kinds of knowledge of a later-mentioned knowledge base. The data memory 5 may be a RAM. The knowledge of the knowledge base may be loaded from an external non-volatile storage medium prior to the processing to be executed, or referred to each time such knowledge is required.

The BUS 6 provides paths for transmitting various signals such as address signals for appointing the components to be controlled by the CPU 2, control signals for controlling various components, data signals exchanged between different components of the system, and so forth.

Figure 2:
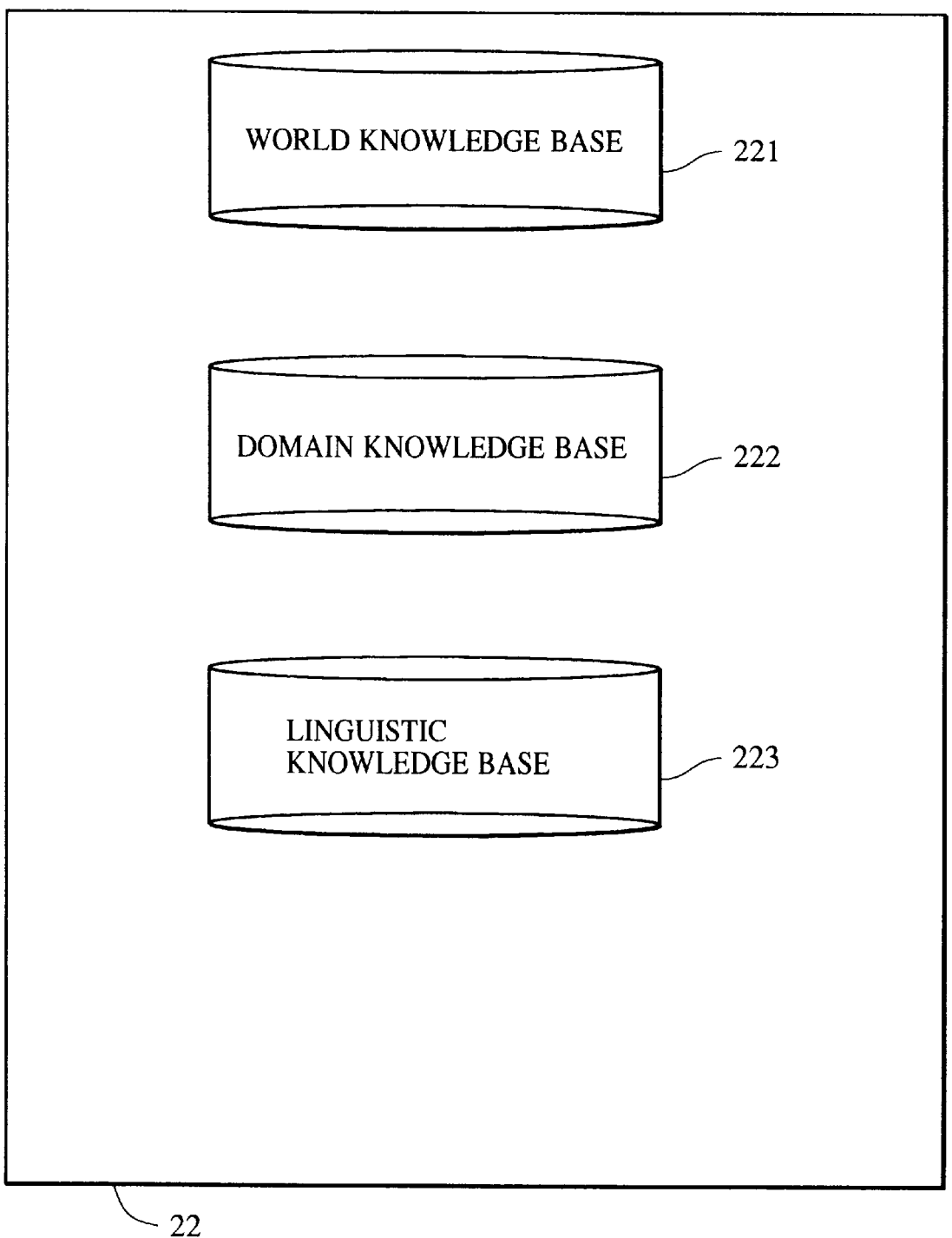
FIG. 2 is an illustration of the detail of a knowledge base.

FIG. 2 shows the detail of the construction of a knowledge base 22 provided in the data memory 5. The knowledge base 22 includes a world knowledge base 221 which contains general knowledge such as knowledge of action, a domain knowledge base 222 which possesses knowledge peculiar to the domain of the information to be processes, and a linguistic knowledge base 223 which contains linguistic information such as parts of speech, grammar and so forth.

Figure 3:
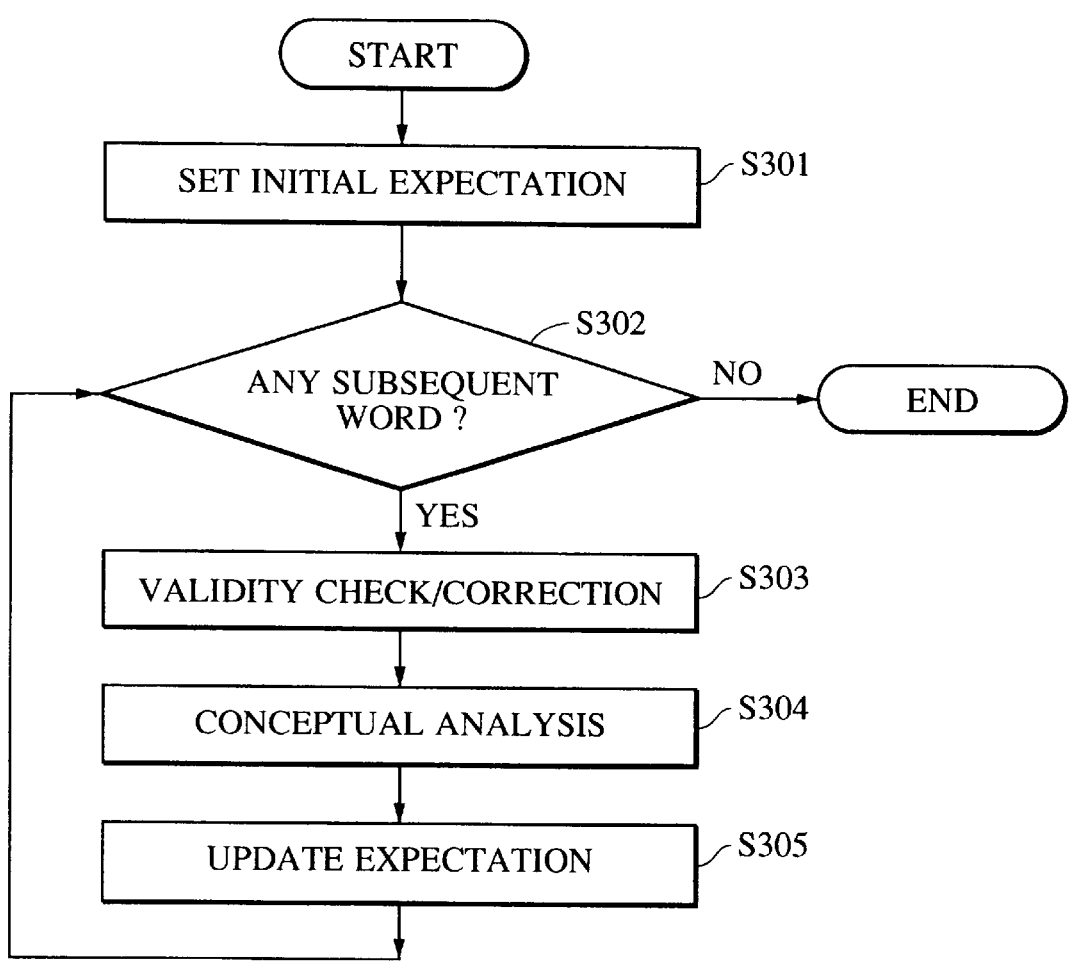
FIG. 3 is a flow chart showing a process for processing recognition result structure.

FIG. 3 is a flow chart illustrative of a processing which is executed after the completion of a recognition process for the purpose of correcting the recognition result based on expectation information. Although not exclusive, the processing in this case is executed in word-by-word fashion.

In Step S301, initial expectation is set to expect a subsequent word.

Step S302 determines whether or not any subsequent word exists. The process terminates when there is no subsequent word. When any subsequent word exists, the process advances to Step S303 which checks validity of the word based on the expectation information. Correction is performed when the word is determined as being invalid. Step S304 conducts later-mentioned conceptual analysis on the basis of practical cases. In Step S305, the expectation is updated to expect the next word. The process then returns to Step S302.

Figure 4:
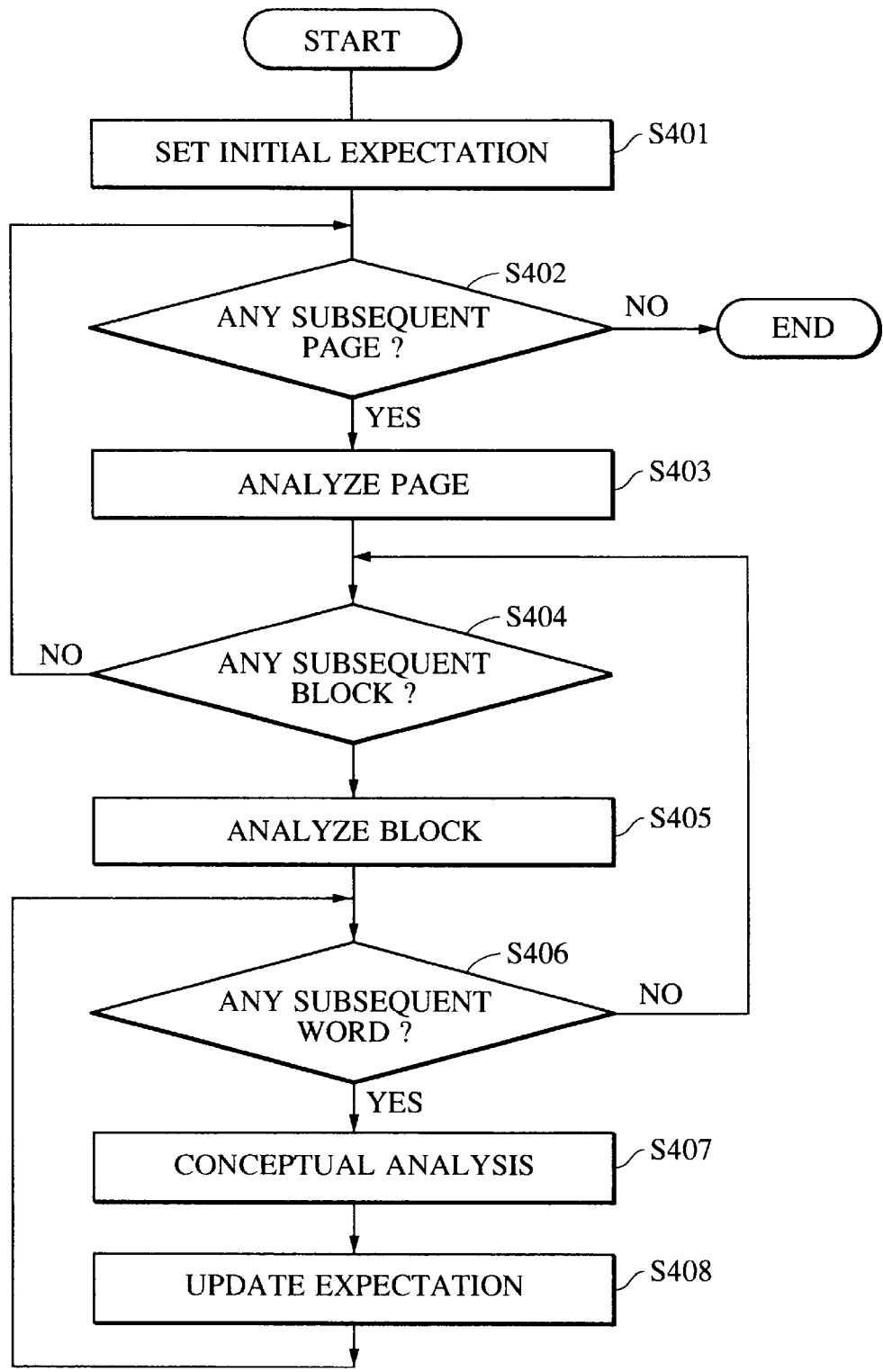
FIG. 4 is a flow chart showing a recognition processing.

FIG. 4 is a flow chart showing a process for incorporating the expectation information in recognition processing. It is assumed here that the object of the processing is sentences which extend over a plurality of pages each containing one or more blocks, and that the processing proceeds from the first block of the first page and advances to the next page after completion of processing of the last block of the first page.

Initial expectation is set in Step S401.

In Step S402, whether or not any subsequent page exists is determined. The process terminates when there is no subsequent page. If a subsequent page exists, the process proceeds to Step S403 which conducts page analysis. In Step S404, determination is made as to whether any subsequent block exists. If no subsequent block exists, the processing on the instant page is finished and the process returns to Step S402. However, if a subsequent block exists, the process advances to Step S405 which conducts block analysis.

Step S406 executes determination as to whether any subsequent word exists. If no subsequent word exists, the process returns to Step S402 after finishing the processing of the block. However, if a subsequent word exists, the process advances to Step S407 which performs conceptual analysis and then advances to Step S408 which updates the expectation. The process then returns to Step S406.

The process performed by the illustrated embodiment of the system in accordance with the invention will be described, on an assumption that the system is used for the purpose of processing Japanese census family register information. Japanese census family register information is not written in the form of complete sentences, but is expressed in the form of consecutive words which describe predetermined items such as birth, marriage and so forth of each individual in a predetermined sequence or order.

Figure 5:
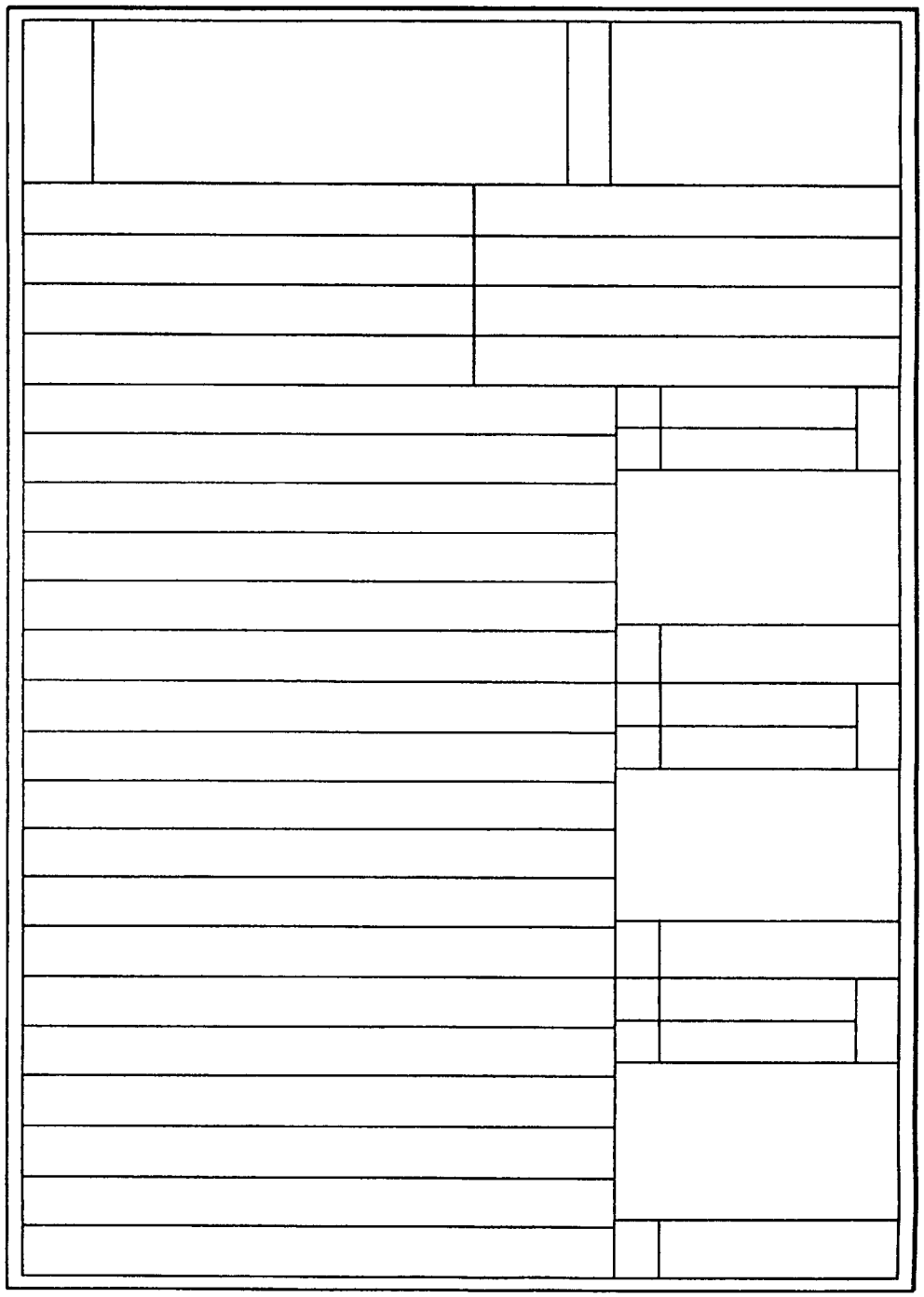
FIG. 5 is an illustration of an example of a census family register.

FIG. 5 shows an example of such a Japanese census family register form. In the following description of the embodiment, an assumption is made that information such as that shown in FIG. 5 is read by an OCR and then processed.

FIG. 6 is a chart showing the knowledge structure concerning <ACTION>. S1 indicates agent of the action, S2 indicates a direct object of the action, S3 indicates an indirect object of the action, S4 indicates an action which is the reason for the indirect object, S6 indicates an action serving as an instrument, S7 indicates a place serving as a support, and S8 indicates time.

Figure 7:
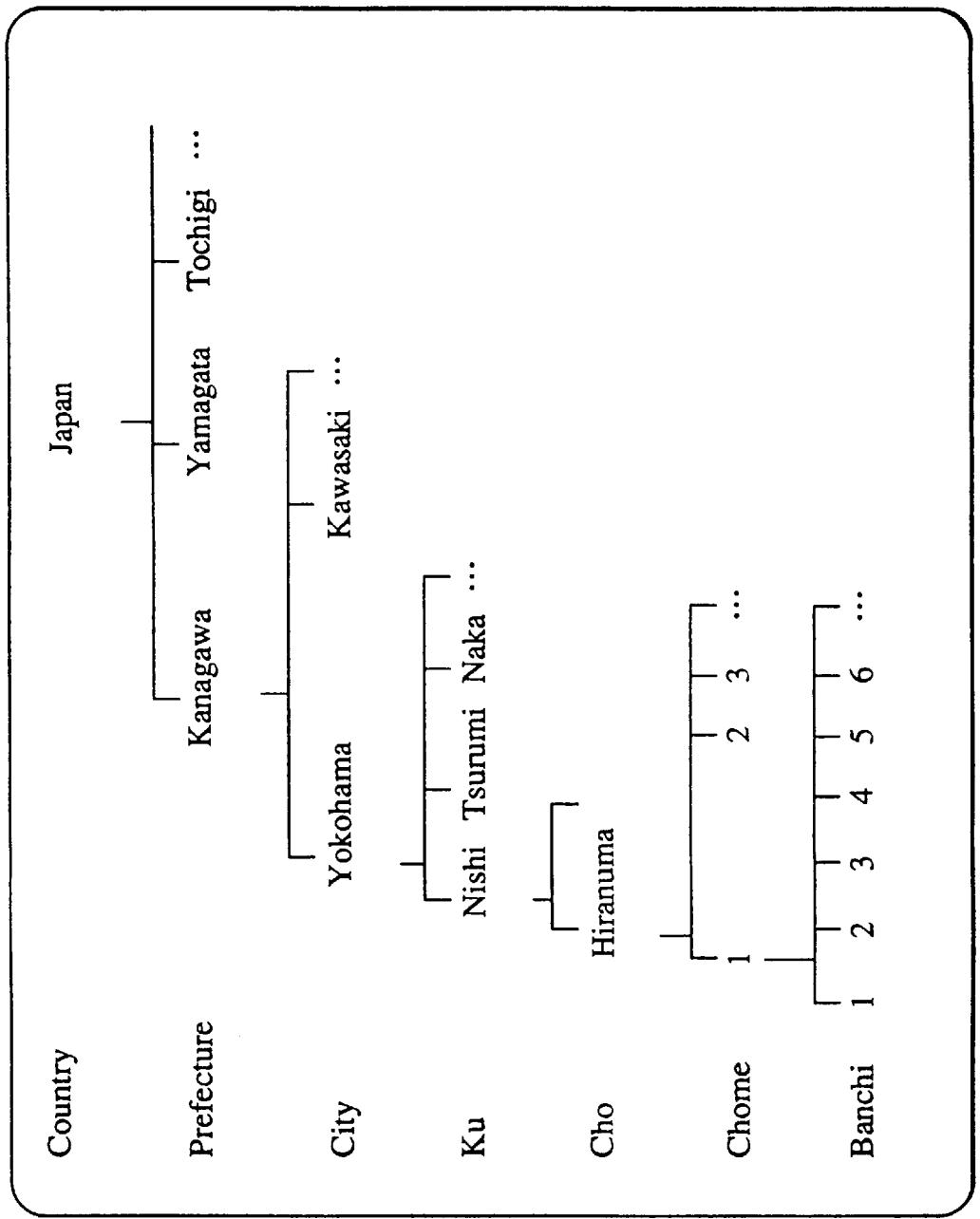
FIG. 7 is a chart illustrative of a hierarchy of expression of a Japanese address.

FIG. 7 shows hierarchy of information concerning addresses used in Japan.

FIG. 8 shows the contents of an ordinary dictionary. Concepts of information shown in the left-hand-side column is shown in the right-hand column.

FIG. 9 shows general rule of description of natural language information, the rule being stored in the aforesaid world knowledge base.

FIG. 10 shows general rule of description of natural language information pertaining to a specific domain, the rule being stored in the aforesaid domain knowledge base.

A description will now be given of the process performed by the system of the invention, by employing a practical example of information. More specifically, in the following description, it is assumed that Japanese statement reading 平成元年壱月弐拾七日横浜市鶴見区で出生 同月弐拾九日父届出入籍 is recognized by a recognition technique using expectation and the recognized information is analyzed into corresponding conceptual structure.

In this case, based on knowledge that all the statement contained in the portion in question of the census family register information pertains to an action of 届出 (notify or declaration), i.e., MTRANS for a certain EVENT which actually took place, empty instances are generated for MTRANS 1 and EVENT 1 shown in FIG. 11.

At the same time, the <Time-Phrase> of EVENT 1 is set as expectation information, with the owner of the block being determined as the agent of the EVENT.

The above-described input information is progressively and successively processed. Since the expectation is for the Time-Phrase, the sub-expectation is for <ERA>, from the general rules shown in FIG. 9. Namely, 平成 (Heisei), 昭和 (Showa), 明治 (Meiji) and so forth are listed as candidate era. This expectation information is given to the recognition section to be used during recognition process. Thus, only few kanji characters are selected and presented for the recognition from among more than several thousands of kanji characters.

As described above, expectation information is given to the recognition section on word-by-word basis. The expectation information given on word-by-word basis is useful and further enhances the accuracy of the recognition, particularly when the character recognition in a character row is conducted in parallel fashion on a plurality of characters. For instance, the expectation information given on word-by-word basis, when used together with parallel processing of a plurality of characters, offers the following advantage. The first character 昭 of the word representing an era 昭和 (Showa) and the first character 明 of the word representing another era 明治 (Meiji) are similar in form to each other. Therefore, when one of these two characters is recognized as a correct character, there is a large possibility that the other character also is listed as a candidate, if the recognition is performed on character basis. Consequently, it is impossible to definitely determine the word, even though the expectation information is used. However, this problem is overcome when the result of the recognition of the second character, obtained through recognition processing conducted in parallel with the first character, is taken into consideration based on the expectation information given on word basis.

It is not essential that a plurality of characters are recognized simultaneously. Namely, the recognition may be conducted sequentially on consecutive characters. In such a case, the process may proceed while leaving a plurality of candidate characters undecided for the first character and one of such candidate characters is determined as the correct character in accordance with the result of recognition of the next character. In some cases, erroneous combination of characters can be excluded by effective use of plural candidate characters.

If 平成 (Heisei) has been recognized and determined as being the correct word based on the expectation information, the concept of this word is stored as <Era=平成 (Heisei)), in the slot S1 of TIME 2.

The next expectation is for the <year> which is expressed in terms of a <Number>. The scope of the number is restricted in accordance with the above-mentioned concept of <ERA>. Namely, the number is limited to range from 1 to 64 when the recognized <ERA> is 昭和 (Showa), and to range from 1 to indefinite when the recognized <ERA> is 平成 (Heisei), as can be seen from FIG. 8. The knowledge shown in FIG. 8 also contains the fact that 1年 (first year) is represented as 元年. Characters such as 元, 二 (second) and so forth are therefore expected as the number which represents the year.

Written Japanese language does not have "space" between successive words, so that the number of characters which should be determined as the <Number> is indefinite. A concept of <YEAR MARK> is used in order to determine the length of the word expressing the year. In this case, the determined word is recognized as 元, based on the expectation information. This result of recognition is treated as <NUMBER (=1)> which is stored in the slot S1 of TIME 2. The next character 年 (year) is the <Year Mark> and is treated as a delimiter which is neglected. Thus, a delimiter is used to determine words from successive pieces of input information and also serves as an index which indicates the kind of information which precedes this delimiter, as well as the kind of information which follows the delimiter. Similarly, 壱 (first=1) is stored in the slot S2 of TIME 2, and 月 (month) is neglected as being <Month Mark>. 弐拾七 (twenty seven) is stored in the slot S3 of TIME 2, and 日 (day) is neglected as being <Day Mark>.

In the above-described process for recognizing the number 弐拾七 (twenty seven), since a number indicating a date has been expected, there is no risk that the number 弐 is erroneously recognized through pattern matching as a different character 武 or 式 which is similar in shape to 弐. Similarly, 拾 is never recognized as 捨. The <Day Mark> has been expected when the character 日 is recognized. This character 日 therefore is not erroneously recognized as being a different similar character 目.

A word 横浜 (Yokohama) is then processed. This word is a <City Name>, so that inference is made based on the rule shown in FIG. 10 to determine that an Address-Phrase has been started. The expectation information is therefore changed to ADDRESS. The name 横浜 (Yokohama) is stored in the slot S4 of ADDRESS 2. The next character 市 is neglected as being a <City Mark>. The next word 鶴見 (Tsurumi) is stored in the slot S3 of ADDRESS 2, and the subsequent character 区 (ku=ward) is neglected as being a <Ku Mark>.

In the foregoing processing pieces of expectation information are given to the recognition section, in accordance with the number of candidates. When a city name is expected, it is not efficient to send the names of all Japanese cities as the pieces of expectation information. However, if the first character of the city name has been correctly identified, the number of the candidate city names can be restricted. For instance, when the first character is 横, city names such as 横浜 (Yokohama), 横須賀 (Yokosuka) and other small number of city names starting with 横 are listed as the candidates which are sent as expectation information to the recognition section. When it is expected that the identified city name is followed by the name of a Ku (ward), all the Ku names may be sent to the recognition section so as to improve recognition accuracy, because the number of wards in a city is not so large.

The next word is で. Since-this word is a casemarker as shown in FIG. 8, an inference is made in accordance with the rule shown in FIG. 10 to determine that the processing of the Address-Phrase is over. The kind of expectation information is therefore changed to BIRTH which is a type of declarations.

Then. BIRTH as the concept of <BIRTH> is obtained, and inference is made in accordance with the rule shown in FIG. 10 so as to determine that the type of the Event 1 as the object of the MTRANS is BIRTH. The kind of expectation information is then changed to Time-Phrase.

The next word 同 (same) is a<PRONOUN 1> and is regarded as information pertaining to the slot S2 (Month) of TIME 1 from the fact that the next to next word is 月 (Month Mark), the contents of slot 12 is copied to slot S2 of time 1. When this word is recognized, the content of the slot S1 of TIME 1 (Era, Year), which shows the preceding time information, is copied to form the information to be stored in the slot S1 of TIME 2. The word 月 (month) is neglected as being a <Month Mark>, and the word 弐拾九 (twenty nine) is stored in the slot S3 of TIME 1. The subsequent single-character word 日 (day) is neglected as being a <Day Mark>.

The next single-character word 父 (father) is determined to be to <Person 1> so that an inference is made to determine that the Time-Phrase is over and <Person> has started. The person identified by the word 父 can be identified from the block information.

The next word 届出 belongs to the concept of MTRANS, so that an inference is made in accordance with the rule shown in FIG. 10 to determine that the MTRANS 1 has been done by the <Person 1>. The <person 1> is therefore stored in the slot S1 of MTRANS 1, and the kind of expectation information is changed to the Time-phrase which is at the beginning of the {Diff Birthplace}, in accordance with the rule shown in FIG. 10.

The next word 入籍 belongs to the concept of <Entry in Family Register>. Since no Time-Phrase could be found, the rule of Diff Birth-place does not apply in accordance with the rule shown in FIG. 10. Thus, an inference is made to conclude that the statement in question has been successfully analyzed. It is therefore inferred that the content of the <Address 1> of the MTRANS 1 is identical to the permanent domicile recorded in the family register holder, and the domicile information is copied to fill the <Address 1>. Consequently, 横浜市鶴見区 is filled in <Address 1>.

FIG. 12 shows the construction of the family register information produced from the input information through the processings described above.

The types of expectation information employed in the processings described above are fixed terms such as 年 (year) and 月 (month) or variable words such as numerals, e.g., dates, city names and so forth which can be determined by trailing words.

It is assumed here that an erroneous recognition result has been obtained to read 平成元年壱月弐拾七日横浜市鶴見区で出生同月弐拾九日父届出八籍 whenthe original statement reads 平成元年壱月弐拾七日横浜市鶴見区で出生,同月弐拾九日父届出入籍. A description will now be given as to a process for correcting such an erroneous input.

In this case, based on knowledge that all the statement contained in the portion in question of the census family register information pertains to an action of 届出 (notify or declaration), i.e., MTRANS for a certain EVENT which actually took place, empty instances are generated for MTRANS 1 and EVENT 1 shown in FIG. 11.

At the same time, the <Time-Phrase> of EVENT 1 is set as expectation information, with the owner of the block being determined as the agent of the EVENT.

The above-described input information is progressively and successively processed. Since the expectation is for the Time-Phrase, from the general rules shown in FIG. 9, the sub-expectation is for <ERA>. Namely, 平成 (Heisei), 昭和 (Showa), 明治 (Meiji) and so forth are listed as candidate era.

Since the recognition result 平成 (Heisei) is found in the expectation information, the concept of this result is stored in the slot S1 of TIME 2 as <Era=平成 (Heisei)>.

The next expectation is for the <year> which is expressed in terms of a <Number>. The scope of the number is restricted in accordance with the above-mentioned concept of <ERA>. Namely, the number is limited to range from 1 to 64 when the recognized <ERA> is 昭和 (Showa), and to range from 1 to indefinite when the recognized <ERA> is 平成 (Heisei), as will be seen from FIG. 8. The knowledge shown in FIG. 8 also contains the fact that 1年 (first year) is represented as 元年. Characters such as 元, 二 (second) and so forth are therefore expected as the number which represents the year.

Written Japanese language does not have "space" between successive words, so that the number of characters which should be determined as the <Number> is indefinite. A concept of <YEAR MARK> is used in order to define the length of the word expressing the year. In this case, the recognized word 元 is found in the expectation information And, therefore, is treated as <NUMBER (=1)> which is stored in the slot S1 of TIME 2 as <Year (=1)>.

The next word 年 (year) is the <Year Mark> and is treated as a delimiter so as to be neglected. Similar processings are performed so that 壱 (first=1) is stored in the slot S2 of TIME 2, and 月 (month) is neglected as being <Month Mark>.

A number indicative of a date is expected for the next word 武拾七. It is therefore determined by inference that 武 has been wrongly recognized for 弐, i.e., that 武 should be corrected to 弐. Thus, 弐拾七 (twenty seven) is stored in the slot S3 of TIME 2, and 日 (day) is neglected as being <Day Mark>.

The word 横浜 (Yokohama) is then processed. This word is a <City Name>, so that inference is made based on the rule shown in FIG. 10 to determine that an Address-Phrase has been started. The expectation information is therefore changed to ADDRESS. The name 横浜 (Yokohama) is stored in the slot S3 of ADDRESS 2. The next character 市 is neglected as being a <City Mark>.

As to the next word 鶴見 a ward (区) name has been expected. The word cannot be found in the data base which lists names of all the wards existing in Yokohama city, whereas a similar ward name 鶴見 is found in the data base. An inference is therefore made to determine that 鶴見 is wrong and should be corrected to 鶴見. The corrected ward name 鶴見 is stored in the slot S4 of ADDRESS 2, and the subsequent word 区 (ku=ward) is neglected as being a <Ku Mark>.

The next word is で. Since this word is a casemarker as shown in FIG. 8, an inference is made in accordance with the rule shown in FIG. 10 to determine that the processing of the Address-Phrase is over. The kind of expectation information is therefore changed to BIRTH which is a type of declarations.

Then. BIRTH as the concept of <BIRTH> is obtained, and inference is made in accordance with the rule shown in FIG. 10 so as to determine that the type of the Event 1 as the object of the MTRANS is BIRTH. The kind of expectation information is then changed to Time-Phrase.

The next word 同 (same) is a<PRONOUN 1> and is regarded as information pertaining to the slot S2 (Month) of TIME 1 and stored in the same slot of TIME 2. When this word is recognized, the content of the slot S1 of TIME 1 (Era, Year), which shows the preceding time information, is copied to form the information to be stored in the slot S1 of TIME 2. The word 月 (month) is neglected as being a <Month Mark>. Since a <Day Mark> as a delimiter is expected subsequently, an inference is made that 目 is wrong and should be corrected to 日. Due to the presence of the delimiter, the subsequent word 弐拾九 (twenty nine) is cut out and stored in the slot S3 of TIME 1. The subsequent single-character word 日 (day) is neglected as being a <Day Mark>.

The next single-character word 父 (father) is determined to be <Person 1> so that an inference is made to determine that the Time-Phrase is over and <Person> has started. The person identified by the word 父 can be identified from the block information.

The next word 届出 belongs to the concept of MTRANS, so that an inference is made in accordance with the rule shown in FIG. 10 to determine that the MTRANS 1 has been done by the <Person I>. The <person 1> is therefore stored in the slot S1 of MTRANS 1, and the kind of expectation information is changed to the Time-phrase which is at the beginning of the {Diff Birthplace} in accordance with the rule shown in FIG. 10.

Next expectation is for Time-Phrase. The next word is 入籍. This word cannot be found as a part of Time-Phase so that a decision is made not to apply the rule of Diff birthplace, and the kind of expectation information is changed to Entry in Family Register (入籍) which belongs to the concept of <Entry in Family Register>. An inference is therefore made that 入籍 is wrong and should be corrected to 入籍. An inference is therefore made to conclude that the statement in question has been successfully analyzed. It is therefore inferred that the content of the <Address 1> of the MTRANS 1 is identical to the permanent domicile recorded in the family register holder, and the domicile information is copied to fill the <Address 1>. Consequently, 横浜市鶴見区 is correctly registered in <Address I>.

Figure 13B:
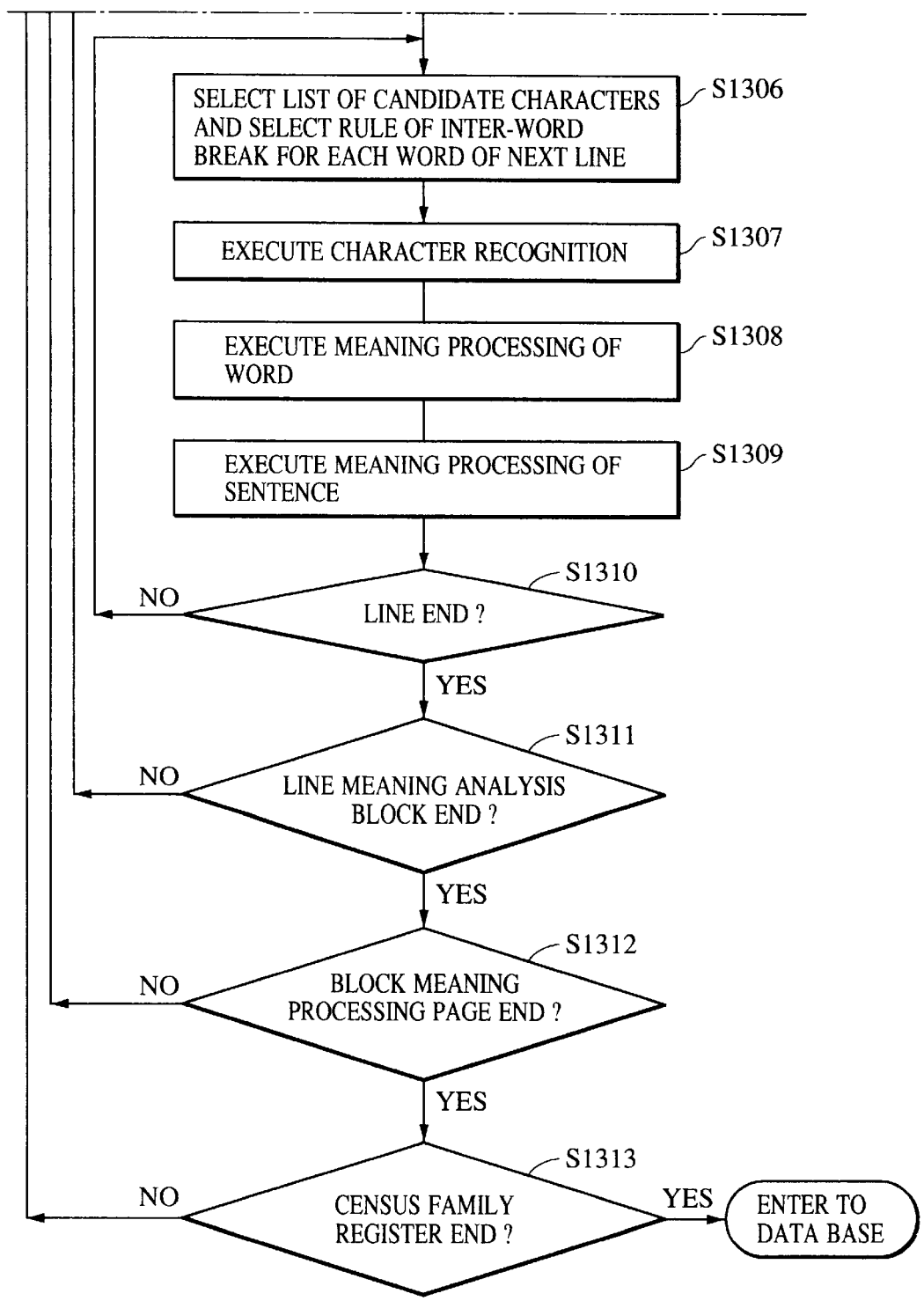

A description will now be given as to a recognition processing relying upon layout information, with specific reference to a flow chart of FIGS. 13A and 13B showing this processing, on an assumption that the census family register information as shown in FIG. 5 has been input.

Referring to FIGS. 13A and 13B, Step S1301 conducts setting of blocks or a new page and determines the sequence of processing. Step S1302 gives expectation for a new block. Step S1303 determines whether expectation has been made for a new line. The term "line" is used here to mean a small unit which provides a meaning. When expectation cannot be done, the process proceeds to Step S1304 in which types of candidate lines are selected. In Step S1305, character recognition is executed on the selected types of line. The process then returns to Step S1303 which determines whether expectation has been made for the line type which has been found as a result of the character recognition.

If the determination in Step S1303 has proved that the expectation has safely been done, the process proceeds to Step S1306 which selects a list of candidate characters and the character rule which determines the break between successive words, for each of the words in the next line. In Step S1307, character recognition processings are executed on expected candidate characters. In Step S1308, meaning processing is executed to determine the meaning of the word. In Step S1309, meaning processing is executed for the sentence down to the instant word.

Step S1310 executes determination as to whether or not the processing has been finished for the line. The process returns to Step S1306 if the processing has not been finished. If the processing has been completed for the line, the process proceeds to Step S1311 which executes meaning analysis of the line and determines whether the processing has been finished for the block. If the processing for the block has been finished, the process advances to Step S1312 which executes meaning processing on the block, followed by determination as to whether or not the processing is finished for the page. If the process has been finished for the page, the process proceeds to Step S1313 which determined whether or not the processing has been completed for the census family register. If the process has not been completed, the process returns to Step S1301, otherwise the results are entered in a data base.

A description will now be given of the census family register form shown in FIG. 5.

Each census family register form contains a plurality of pages, each including one or more blocks. Fixed positional or layout information indicative of the relationship between each page and blocks contained therein has been stored in a knowledge base of a specific domain, in order to enable extraction of all the necessary information.

The layout information is effectively used by the system when the system performs various processings such as setting of expectation information, checking of validity of information and identification of person indicated by a common noun such as 父 (father). In the illustrated example, the content of data is determined based on the block position and header, so as to facilitate the setting of the candidate context.

The block headed by 本籍 (permanent domicile) contains the actual address (Address-Phase) as data indicating a registered place. Setting of the expectation to <Address-Phrase> therefore helps the system in recognizing the data shown in this block.

The block headed by 氏名 (name) contains information concerning the register holder, written in a format which is family name-space-given name. In contrast, in the block relating to BIRTH declaration, the name is written without giving a space between the family name and the given name. This information contained in the block headed by 氏名 (name) can therefore be used effectively to assist analysis of the statement of a person's name in the block pertaining to birth declaration.

The next line contain information as to when the census family register in question was formed. Usually, a new family register is formed at the time of marriage. The marriage date is therefore set as being default.

Each page is divided into blocks allocated for individuals, so that each block contains BIRTH information and declaration of events concerning the individual person. The name (family name and given name) of the individual, name of father, name of mother, date of birth, sex, and other information such as the order of the individual among brothers and sisters, e.g., 長女 (eldest daughter) are written in lower part of the blank.

As will be seen from FIG. 5, each block is headed by a header which indicates the content of information contained in the block. Thus, the header 父 (father) naturally leads to an expectation that the content of the data in the block is the father's name.

Information or data mentioned above can effectively be used when the system confirms data written in declarations. For instance, data concerning the date of birth, which is clearly written in the BIRTH declaration can be checked up with the data concerning the date of birth appearing in a lower block. Similarly, persons indicated by common nouns such as 父 (father) and 母 (mother) can be correctly correlated to their names.

Declarations of event relating to a plurality of persons has a block for each of such persons, and the matter or the fact of declaration of event is written in each of the blocks. For instance, the fact of marriage is written both in the block for the husband and the block for the wife. Such knowledge assists the system in making confirmation and expectation.

a description will now be given of another example of recognition processing which relies upon layout information.

FIG. 14 shows an out-door duty form which is an object of recognition by the recognition system in accordance with the present invention.

In this case, the system performs recognition and analysis of input information by using knowledge of area concerning the layout of this form. For instance, the heading reading "Employee code" leads to an expectation that a number follows this heading. Once the number is recognized, the system can make access to the data base in order to expect and set the name and the division of the employee. Any ambiguity which may exists in the result of recognition of the number can be removed when reference is made to the employee's name and the division. Some of the blanks have only limited candidates to fill such blanks. For instance, the line headed by "Mode of Transport" can be filled only by one of train, bus, taxi and personal car, or a combination thereof.

A description will now be given of the case where the invention is applied to voice recognition.

As in the case of character recognition, accuracy of voice correction is enhanced when the recognition is conducted with the help of expectation.

It is supposed here that a voice message "I shall meet you at five p.m." has been input. Once the recognition has been completed till "I shall", it is expected that the subsequent word is a verb. In this case, although both "meet" and "meat" are listed as candidates through a voice pattern matching, the former, i.e., "meet", is selected since "meat" is a noun rather than a verb.

After the analysis has proceeded to "I shall meet you at", it is expected that "at" is followed by a noun indicating a place or time. The word "five", therefore, is never recognized as "fine", although the pronunciation is similar.

When the analysis has proceeded to "pm" while leaving "five" and "nine" as candidates, it might be considered that nine p.m. is inappropriate for a meeting time, from a knowledge base or the context, so that the "nine" is deleted from the group of candidates or put to a lower order of preference of candidate words.

It is assumed here that the above-mentioned message has been input through a keyboard, with the word "meet" wrongly spelled as "meat". In such a case, however, the system can automatically correct the word "meat" into "meet", since it expects a verb as the word which follows "I shall".

A description will now be given of an example in which a first candidate word for a certain part of the recognized result is changed into another candidate part, with a consequence that the first candidate for another part of the recognition result is changed to another candidate correspondingly.

Figure 15:
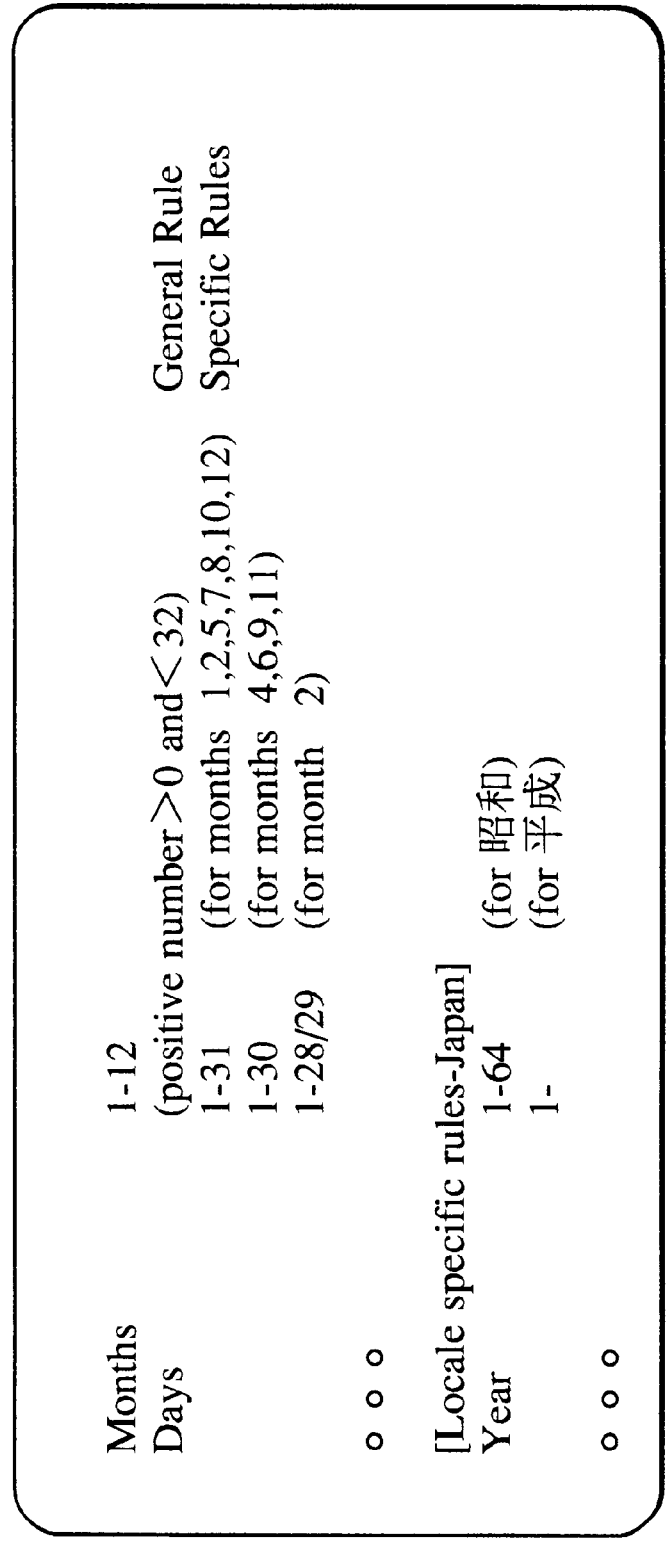
FIG. 15 is an illustration of knowledge contained in an ordinary dictionary.
Figure 16:
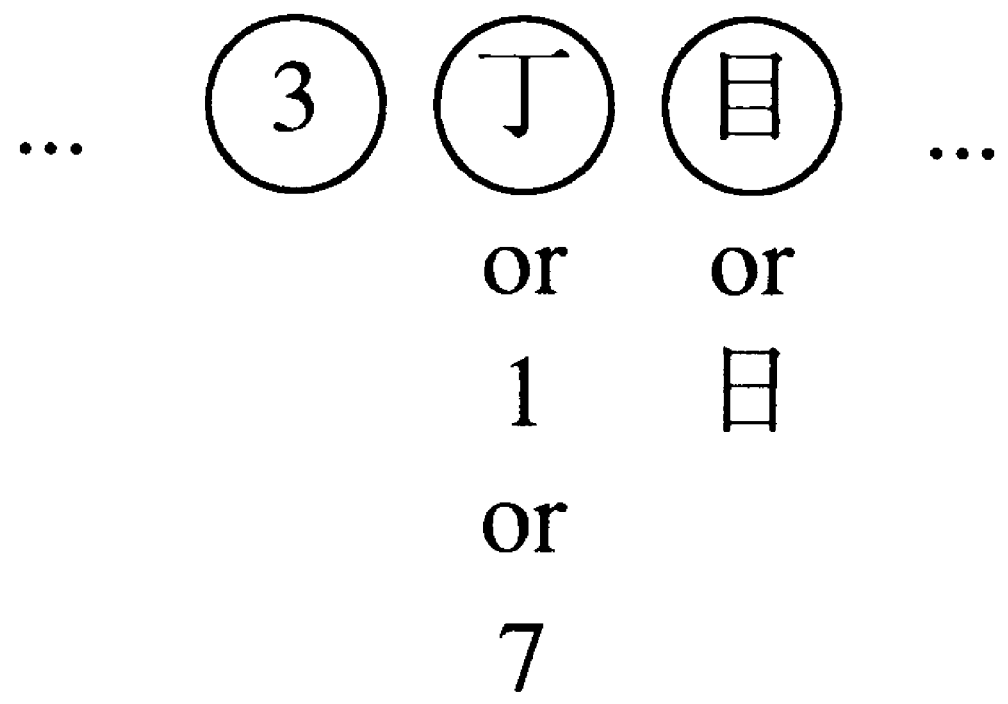

FIG. 15 is an illustration of a common knowledge used in the above-mentioned example of processing, while FIG. 16 is a diagrammatic illustration of the recognition result to be processed in accordance with the method of the present invention. Encircled characters are the first candidates, and characters show below circles are other candidates. It is assumed that the user has changed 目 into 日. The system then reviews the recognition result which already has been acquired. The system recognizes that the word 3丁目 does not make any sense and considers alternative words such as 31日 and 37日. The system then refers to the knowledge base as shown in FIG. 15 to reach a conclusion that the word 37 日 is inappropriate as a word which expresses a date. The system therefore selects 31日 as the most appropriate candidate and changes 丁 into numeral 1.

Obviously, the present invention can be carried out in various forms, provided that they can perform the function of the invention. Thus, the method of the invention may be realized in the form of a single unit apparatus, a system composed of a plurality of apparatuses or a program which may be loaded on an apparatus or a system.

As will be understood from the foregoing description, according to the described various forms of invention, it is possible to progressively and sequentially process a series of natural language information groups of different types, while expecting, each time a recognition is performed, the object to be recognized subsequently.

It is also possible to input natural language information and to expect information of a part of the inputted series of natural language information groups of different types.

Furthermore, the present invention makes it possible to produce correct analysis result, even when any error is contained in the inputted information.

The present invention as described may be applied to a system which is composed of a plurality of computers or only to a selected computer of a system having a plurality of computers. The invention also can be applied when the computer is achieved by executing a program. Such a program may be supplied from an external memory medium, and such external storage medium also falls within the scope of the present invention.

Although the present invention has been described in its preferred form with a certain degree of particularity, many apparently widely different embodiments of the invention can be made without departing from the spirit and the scope thereof. It is also to be understood that the invention is not limited to the specific embodiments thereof except as defined in the appended claims.

What is claimed is:

1. A natural language processing apparatus comprising:
   recognition means for progressively and sequentially recognizing a series of natural language information groups of a plurality of types, each series comprising a sequence of words;
   knowledge base means for storing knowledge of the types of said natural language information and restriction knowledge of restrictions on a sequence of words in a series of natural language information groups of the plurality of types; and
   expectation means, which makes reference to the knowledge stored in said knowledge base means to supply a recognition candidate comprising a word expected to be next recognized by said recognition means, to said recognition means each time before said recognition means recognizes a next word, for use in recognizing the next word as one of the recognition candidates by said recognition means in processing the next word.

2. A natural language processing apparatus according to claim 1, wherein said recognition means selects a word from among the recognition candidates supplied by said expectation means.

3. A natural language processing apparatus according to claim 1, further comprising analysis means for analyzing natural language information obtained as a result of the recognition performed by said recognition means.

4. A natural language processing apparatus according to claim 1, wherein said expectation means generates a recognition candidate based on previous results of recognition by said recognition means by referring to the knowledge stored in said knowledge base means.

5. A natural language processing apparatus according to claim 1, wherein said recognition means recognizes character information of a natural language.

6. A natural language processing apparatus according to claim 1, wherein the restriction knowledge stored in said knowledge base means contains information concerning the physical position of said series of natural language information groups of different types with respect to each other on a physical medium.

7. A natural language processing apparatus according to claim 1, wherein said recognition means recognizes voice information of a natural language.

8. A natural language processing apparatus comprising:
   input means for inputting natural language information comprising a series of natural language information groups of a plurality of types, each series comprising a sequence of words;
   knowledge base means for storing knowledge of the types of said natural language information and restriction knowledge of restrictions on a sequence of words in a series of natural language information groups of the plurality of types;
   expectation means for, prior to the inputting of a next word by said input means, generating an expected next word expected to be input next by said input means by making reference to the knowledge stored in said knowledge base means, and
   correction means for correcting the next inputted word in accordance with the expected next word generated in said expectation means.

9. A natural language processing apparatus according to claim 8, further comprising analysis means for analyzing the natural language information obtained as a result of the correction performed by said correction means.

10. A natural language processing apparatus according to claim 8, wherein said expectation means generates an expected word, which is part of a series of natural language information groups based on a previously input word of the series by making reference to the knowledge stored in said knowledge base.

11. A natural language processing apparatus according to claim 8, wherein said input means inputs the results of recognition of character information of a natural language performed by a character recognition apparatus.

12. A natural language processing apparatus according to claim 8, wherein said input means inputs the results of recognition of voice information of a natural language performed by a voice recognition apparatus.

13. A natural language processing apparatus according to claim 8, wherein said input means inputs, as the results of recognition, a plurality of candidates for one object of recognition, and wherein said correction means performs correction by replacing the first one of said candidates with another.

14. A natural language processing apparatus according to claim 11, wherein restriction knowledge stored in said knowledge base means contains information concerning the physical position of said series of natural language information groups of different types with respect to each other on a physical medium.

15. A natural language processing apparatus according to claim 8, wherein said input means have keys through which characters are inputted.

16. A natural language processing method comprising:
   a recognizing step for progressively and sequentially recognizing a series of natural language information groups of a plurality of types, each series comprising a sequence of words with recognizing means; and
   an expecting step for referring to a knowledge base which contains knowledge of the types of said natural language information and knowledge of restrictions on a sequence of words in a series of natural language information groups of a plurality of types and for supplying a recognition candidate comprising a word expected to be next recognized in said recognizing step to said recognizing means each time before said recognizing step recognizes a next word, for use in recognizing the next word as one of the recognition candidates by said recognizing means in recognizing the next word.

17. A natural language processing method according to claim 16, wherein said recognizing step selects a word from among the recognition candidates supplied by said expectation step.

18. A natural language processing method according to claim 17, further comprising analyzing step in which the natural language information obtained as a result of recognition executed in said recognizing step is analyzed.

19. A natural language processing method according to claim 16, wherein said expecting step generates a recognition candidate based on the results of a previous recognition executed in said recognizing step, by making reference to the knowledge stored in said knowledge base.

20. A natural language processing method according to claim 16, wherein said recognizing step recognizes character information of a natural language.

21. A natural language processing method according to claim 16, wherein said expecting step makes reference to layout information concerning layout of said series of natural language information groups of a plurality of types on a sheet, said layout information being stored in said knowledge base and used as said information concerning restriction.

22. A natural language processing method according to claim 16, wherein said recognizing step recognizes voice information of a natural language.

23. A natural language processing method comprising:
   an inputting step in which a series of natural language information groups of a plurality of types is inputted, each series comprising a sequence of words; and
   an expecting step for, prior to the inputting of each word in said inputting step, generating an expected word expected to be input in said inputting step by referring to knowledge stored in a knowledge base which stores knowledge of the types of said natural language information and knowledge of restrictions on a sequence of words in a series of natural language information groups of the plurality of types; and
   a correction step for correcting a next inputted word in accordance with the expected next word generated in said expecting step.

24. A natural language processing method according to claim 23, further comprising an analyzing step in which the natural language information obtained as the result of the correction executed in said correcting step is analyzed.

25. A natural language processing method according to claim 23, wherein said expecting step generates an expected word, which is part of a series of natural language information groups based on a previously input word of the series by making reference to the knowledge stored in said knowledge base.

26. A natural language processing method according to claim 23, wherein said inputting step inputs results of recognition of character information of a natural language performed in accordance with a character recognition technique.

27. A natural language processing method according to claim 23, wherein said inputting step inputs the results of recognition of voice information of a natural language performed in accordance with a voice recognition technique.

28. A natural language processing method according to claim 23, further comprising the step of recognizing words of the natural language information, wherein said inputting step inputs a plurality of candidates to be used in said recognizing step for recognizing one word, and wherein said correcting step executes correction by replacing the first one of said candidates with another of said candidates.

29. A natural language processing method according to claim 26, wherein said expecting step makes reference to layout information concerning layout of said series of natural language information groups of a plurality of types on a sheet, said layout information being stored in said knowledge base and used as said information concerning restriction.

30. A natural language processing method according to claim 24, wherein said inputting step inputs characters through keys.

31. A computer-readable storage medium storing a program for controlling a computer, said program comprising codes for causing the computer to perform:
   a recognizing step for progressively and sequentially recognizing with recognizing means a series of natural language information groups of a plurality of types, each series comprising a sequence of words; and
   an expecting step for referring to a knowledge base which contains knowledge of the types of said natural language information and knowledge of restrictions on a sequence of words in a series of natural language information groups of a plurality of types and for supplying a recognition candidate comprising a word expected to be next recognized in said recognizing step to said recognition means each time before said recognizing step recognizes a next word, for use in recognizing the next word as one of the recognition candidates by said recognition means in recognizing the next word.

32. A computer-readable storage medium storing a program for controlling a computer, said program comprising codes for causing the computer to perform:

an inputting step in which a series of natural language information groups of a plurality of types is inputted, each series comprising a sequence of words an expecting step for, prior to the inputting of each word in said inputting step, generating an expected word expected to be input in said inputting step by referring to knowledge stored in a knowledge base which stores knowledge of the types of said natural language information and knowledge of restrictions on a sequence of words in a series of natural language information groups of the plurality of types; and a correction step for correcting a next inputted word in accordance with the expected next word generated in said expecting step.

* * * * *

UNITED STATES PATENT AND TRADEMARK OFFICE
CERTIFICATE OF CORRECTION

PATENT NO. : 6,029,123
DATED : February 22, 2000
INVENTOR(S) : Aruna ROHRA SUDA, et al.

It is certified that error appears in the above-identified patent and that said Letters Patent is hereby corrected as shown below:

COLUMN 1:

Line 18, "known" should read --known,--.
Line 22, "system employs" should read --systems employ--.
Line 29, "making a" should read --making--.

COLUMN 2:

Line 31, "said" should read --the--.
Line 33, "said" should read --the--.
Line 46, "said" should read --the--.
Line 47, "said" should read --the--.
Line 55, "said" should read --the--.
Line 58, "said" should read --the--.
Line 60, "said" should read --the--.
Line 66, "said" should read --the--.

UNITED STATES PATENT AND TRADEMARK OFFICE
CERTIFICATE OF CORRECTION

PATENT NO. : 6,029,123

DATED : February 22, 2000

INVENTOR(S) : Aruna ROHRA SUDA, et al.

It is certified that error appears in the above-identified patent and that said Letters Patent is hereby corrected as shown below:

COLUMN 3:

Line 1, "said" should read --the--.
Line 4, "said" should read --the--.
Line 5, "said" should read --the--.
Line 12, "accompanying" should read --the accompanying--.
Line 13, "illustrates" should read --illustrate--.
Line 26, "recognition" should read --a recognition--.
Line 39, "census" should read --a census--.
Line 45, "chart" should read --charts--.

COLUMN 4:

Line 12, "results" should read --the results--.
Line 16, "arrange" should read --arrange the device--.
Line 17, "unit 1" should read --units 1,-- and "above" should read --above,--.
Line 19, "logical" should read --the logical--.
Line 26, "device" should read --device,--.
Line 49, "signals" should read --signals,--.
Line 50, "signals" should read --signals,--.
Line 54, "detail" should read --details--.
Line 57, "knowledge" (first occurrence) should read --knowledge,--.
Line 58, "222" should read --222,--.

UNITED STATES PATENT AND TRADEMARK OFFICE
CERTIFICATE OF CORRECTION

PATENT NO. : 6,029,123

DATED : February 22, 2000

INVENTOR(S) : Aruna ROHRA SUDA, et al.

It is certified that error appears in the above-identified patent and that said Letters Patent is hereby corrected as shown below:

COLUMN 4 (Continued):

Line 59, "processes," should read --processed,--.
Line 60, "223" should read --223,--.
Line 61, "information" should read --information,-- and "grammar" should read --grammar,--.
Line 66, "in" should read --in a--.

COLUMN 5:

Line 1, "initial" should read --an initial--.
Line 6, "S303" should read --S303,-- and "checks" should read --checks the--.
Line 21, "Initial" should read --The initial--.
Line 25, "page" should read --a page--.
Line 26, "determination" should read --a determination--.
Line 30, "S405" should read --S405,--.
Line 31, "determination" should read --a determination--.
Line 35, "S407" should read --S407,--.
Line 40, "on an" should read --on the--.
Line 45, "marriage" should read --marriage,-- and "forth" should read --forth,--.
Line 53, "agent" should read --an agent--.
Line 63, "is shown" should read --are shown--.
Line 64, "general" should read --the general--.

UNITED STATES PATENT AND TRADEMARK OFFICE
CERTIFICATE OF CORRECTION

PATENT NO. : 6,029,123

DATED : February 22, 2000

INVENTOR(S) : Aruna ROHRA SUDA, et al.

It is certified that error appears in the above-identified patent and that said Letters Patent is hereby corrected as shown below:

COLUMN 6:

Line 1, "general" should read --the general--.
Line 7, "Japanese" should read --the Japanese--.
Line 9, "expectation" should read --an expectation--.
Line 10, "into" should read --into a--.
Line 32, "on" should read --on a--.
Line 33, "on" should read --on a--.
Line 37, "on" should read --on a--.
Line 46, "on" should read --on a--.
Line 52, "on" should read --on a--.
Line 61, "erroneous" should read --an erroneous--.

COLUMN 7:

Line 14, "have" should read --have a--.
Line 42, "inference" should read --the inference--.
Line 51, "processing" should read --processing,--.

COLUMN 8:

Line 6, "since-this" should read --since this--.
Line 10, "BIRTH" should read --BIRTH,--.
Line 11, "tions." should read --tion.--.

UNITED STATES PATENT AND TRADEMARK OFFICE
CERTIFICATE OF CORRECTION

PATENT NO. : 6,029,123
DATED : February 22, 2000
INVENTOR(S) : Aruna ROHRA SUDA, et al.

It is certified that error appears in the above-identified patent and that said Letters Patent is hereby corrected as shown below:

COLUMN 8 (Continued):

Line 12, "Then." should read --Then-- and "and" should read --and the--.
Line 17, "a<PRONOUN" should read --a <PRONOUN--.
Line 30, "be to" should read --be--.
Line 37, "<person 1> should read --<Person 1>--.
Line 39, "Time-phrase" should read --Time-phrase,--
Line 56, "terms" should read --terms,--.
Line 58, "forth" should read --forth,--.
Line 63, "whenthe" should read --when the--.

COLUMN 9:

Line 3, "all" should read --all of--.
Line 16, "(Meiji)" should read --(Meiji),--.
Line 34, "Written" should read --The written--.
Line 40, "And," should read --and,--.
Line 45, "ofTime" should read --of Time--.
Line 54, "inference" should read --the inference-- and "made" should read --made,--.
Line 55, "FIG. 10" should read --FIG. 10,--.

COLUMN 10:

Line 9, "BIRTH" should read --BIRTH,--.
Line 10, "tions." should read --tion.--.

UNITED STATES PATENT AND TRADEMARK OFFICE
CERTIFICATE OF CORRECTION

PATENT NO. : 6,029,123

DATED : February 22, 2000

INVENTOR(S) : Aruna ROHRA SUDA, et al.

It is certified that error appears in the above-identified patent and that said Letters Patent is hereby corrected as shown below:

COLUMN 10 (continued):

Line 11, "Then." should read --Then--.
Line 12, "inference" should read --the inference--.
Line 38, "<person" should read --<Person--.
Line 43, "Next" should read --The next-- and "for" should read --for a--.
Line 56, "<Address I>." should read --<Address 1>.
Line 63, "setting" should read --a setting-- and "or a" should read --for a--.

COLUMN 11:

Line 1, "expectation" should read --the expectation--.
Line 2, "expectation" should read --the expectation--.
Line 4, "expectation" should read --an expectation--.
Line 5, "done," should read --performed,--.
Line 9, "expectation" should read --an expectation--.
Line 12, "done," should read --performed,--.
Line 13, "S1306" should read --S1306,--.
Line 21, "determination" should read --a determination--.
Line 25, "S1311" should read --S1311,--.
Line 28, "S1312" should read --S1312,--.
Line 30, "determination" should read --a determination--.
Line 32, "determined" should read --determines--.
Line 35, "S1301," should read --S1301;--.
Line 48, "person" should read --a person--.

UNITED STATES PATENT AND TRADEMARK OFFICE
CERTIFICATE OF CORRECTION

PATENT NO. : 6,029,123

DATED : February 22, 2000

INVENTOR(S) : Aruna ROHRA SUDA, et al.

It is certified that error appears in the above-identified patent and that said Letters Patent is hereby corrected as shown below:

COLUMN 11 (continued):

Line 50, "data" should read --the data--.
Line 51, "header," should read --the header,--.
Line 54, "(Address-Phase)" should read --(Address-Phrase)--.

COLUMN 12:

Line 1, "contain" should read --contains--.
Line 4, "default." should read --a default.--.
Line 6, "decla-" should read --a decla---
Line 8, "name" (third occurrence) should read --the name--.
Line 9, "name" should read --the name-- and "date" should read --the date-- and "sex" should read --the sex--.
Line 10, "mation" should read --mation,--.
Line 21, "declaration" should read --declaration,--.
Line 23, "nouns" should read --nouns,--.
Line 24, "(mother)" should read --(mother),--.
Line 26, "event" should read --events-- and "has" should read --have--..
Line 28, "declaration" should read --the declaration-- and "event" should read --the event--.
Line 31, "making" should read --performing-- and "expectation." should read --expectation operations--.
Line 32, "a description" should read --A description--.
Line 33, "recognition" should not be indented.

UNITED STATES PATENT AND TRADEMARK OFFICE
CERTIFICATE OF CORRECTION

PATENT NO. : 6,029,123

DATED : February 22, 2000

INVENTOR(S) : Aruna ROHRA SUDA, et al.

It is certified that error appears in the above-identified patent and that said Letters Patent is hereby corrected as shown below:

COLUMN 12 (Cont'd):

Line 34, "mation." should not be indented.
Line 39, "area" should read --areas--.
Line 43, "make" should be deleted and "to" (first occurrence) should be deleted.
Line 45, "exists" should read --exist--.

COLUMN 13:

Line 24, "show" should read --shown--.
Line 56, "is achieved" should read --operates--.

COLUMN 15:

Line 52, "analyzing" should read --an analyzing--.

COLUMN 16:

Line 53, "claim 24," should read --claim 26,--.

UNITED STATES PATENT AND TRADEMARK OFFICE
CERTIFICATE OF CORRECTION

PATENT NO. : 6,029,123

DATED : February 22, 2000

INVENTOR(S) : Aruna ROHRA SUDA, et al.  Page 9 of 9

It is certified that error appears in the above-identified patent and that said Letters Patent is hereby corrected as shown below:

COLUMN 17:

Line 13, "words" should read --words;--.

Signed and Sealed this

Twenty-ninth Day of May, 2001

Attest:

NICHOLAS P. GODICI

*Attesting Officer*   *Acting Director of the United States Patent and Trademark Office*